United States Patent [19]

Guo

[11] Patent Number: 5,519,103
[45] Date of Patent: *May 21, 1996

[54] ALLYL ESTER COPOLYMERS WITH ALLYLIC ALCOHOLS OR PROPOXYLATED ALLYLIC ALCOHOLS

[75] Inventor: Shao-Hua Guo, West Goshen, Pa.

[73] Assignee: Arco Chemical Company, Greenville, Del.

[*] Notice: The term of this patent shall not extend beyond the expiration date of Pat. No. 5,420,216.

[21] Appl. No.: 430,654

[22] Filed: Apr. 28, 1995

Related U.S. Application Data

[62] Division of Ser. No. 309,699, Sep. 21, 1994.

[51] Int. Cl.$^6$ .................................................. C08F 218/02
[52] U.S. Cl. ............................................................ 526/330
[58] Field of Search ................................................ 526/330

[56] References Cited

U.S. PATENT DOCUMENTS

| | | | |
|---|---|---|---|
| 2,355,330 | 4/1928 | Rehberg et al. | 526/330 |
| 2,475,297 | 7/1949 | Shokal et al. | 526/330 |
| 2,476,936 | 7/1949 | Whetstone | 526/330 |
| 2,600,420 | 6/1952 | Neher et al. | 526/330 |
| 2,917,538 | 12/1959 | Carlyle | 260/486 |
| 2,965,615 | 12/1960 | Tess | 260/77.5 |
| 3,267,058 | 8/1966 | Hixenbaugh | 260/23 |
| 3,423,341 | 1/1969 | Klare et al. | 260/22 |
| 3,457,324 | 7/1969 | Sekmakas | 260/834 |
| 3,485,152 | 12/1969 | Koch | 260/23.7 |
| 3,876,588 | 4/1975 | Sackmann et al. | |
| 3,966,403 | 6/1976 | Papantoniou et al. | 526/330 |
| 3,966,404 | 6/1976 | Papantoniou et al. | 526/330 |
| 4,476,252 | 10/1984 | Esselborn et al. | 526/330 |
| 4,939,221 | 7/1990 | Gagnon et al. | 526/330 |
| 5,019,609 | 5/1991 | Toyonishi et al. | 526/330 |
| 5,070,140 | 12/1991 | Lind et al. | 526/330 |
| 5,382,642 | 1/1995 | Guo . | |
| 5,420,216 | 5/1995 | Guo et al. . | |

FOREIGN PATENT DOCUMENTS

| | | | |
|---|---|---|---|
| 695718 | 10/1964 | Canada | 526/330 |
| 581170 | 10/1946 | United Kingdom | 526/330 |
| 743165 | 1/1956 | United Kingdom | 526/330 |
| 892106 | 3/1962 | United Kingdom | 526/330 |
| 1103947 | 2/1968 | United Kingdom | 526/330 |

OTHER PUBLICATIONS

S. R. Sandler and W. Karo, Polymer Synthesis, vol. III (1980) Chapter 8, "Polymerization of Allyl Esters," pp.248–294.
N. Swern et al., J. Am. Chem. Soc. 71 (1949) 1152.

Primary Examiner—Joseph L. Schofer
Assistant Examiner—N. Sarofim
Attorney, Agent, or Firm—Jonathan L. Schuchardt

[57] ABSTRACT

Allyl ester copolymers with allylic alcohols and propoxylated allylic alcohols are disclosed. The high primary hydroxyl group content and favorable solubility characteristics make the allyl ester copolymers easy to formulate into many polymer products, including polyurethanes, polyesters, melamines, alkyds, uralkyds, and crosslinked polymeric resins.

5 Claims, No Drawings

ALLYL ESTER COPOLYMERS WITH ALLYLIC ALCOHOLS OR PROPOXYLATED ALLYLIC ALCOHOLS

This is a division of application Ser. No. 08/309,699 filed Sep. 21, 1994, now allowed.

1. Field of the Invention

The invention relates to copolymers of allyl esters and allylic alcohols or propoxylated allylic alcohols. The copolymers, which have a high concentration of primary hydroxyl groups, are useful in many types of curable polymer systems, including solvent-free liquid adhesives.

2. Background of the Invention

Allyl alcohol, a well-known monomer, is available commercially from isomerization of propylene oxide. Ethylenic polymerization of allylic alcohols with other olefins is a potential route to copolymers that have a high concentration of primary hydroxyl groups. Such copolymers are potentially valuable polymers intermediates because they will cure rapidly with isocyanates, anhydrides, and melamine resins to give useful thermoset articles.

Few allylic alcohol copolymers have actually become commercially important. Poly(allyl alcohol), for example, is not widely used in spite of its high concentration of primary hydroxyl groups because of its poor solubility in most common organic solvents. Copolymers of allyl alcohol and typical vinyl monomers such as styrene are known, but because allyl alcohol reacts much more slowly than vinyl monomers, a large excess of allyl alcohol is needed in the copolymerization to get a desirable hydroxyl group content.

Allyl ester polymers are known, but because allyl esters polymerize slowly with even high levels of free-radical initiators to give polymers of only low molecular weight, few allyl esters have any industrial use for polymers and copolymers (see S. R. Sandler and W. Karo, Polymer Syntheses, Vol. III (1980), Chapter 8, "Polymerization of Allyl Esters," pp. 248–294, at page 263).

New allylic alcohol and allyl ester copolymers are needed. Particularly valuable copolymers would be easy to prepare and would have a high concentration of primary hydroxyl groups. Preferably, the copolymers would be soluble in common organic solvents to enable easy formulation into polyurethanes, polyesters, melamines, alkyd coatings, uralkyds, and other thermoset polymers.

SUMMARY OF THE INVENTION

The invention is an allyl ester/allylic alcohol copolymer. The copolymer comprises recurring units of (a) an allyl ester of the formula $CH_2=CR'-CH_2-O-CO-R$ in which R is hydrogen or a saturated linear, branched, or cyclic $C_1-C_{30}$ alkyl, aryl, or aralkyl group, and R' is selected from the group consisting of hydrogen and $C_1-C_5$ alkyl; and (b) an allylic alcohol of the formula $CH_2=CR'-CH_2-OH$ in which R' is selected from the group consisting of hydrogen and $C_1-C_5$ alkyl. The copolymer has an average hydroxyl functionality within the range of about 2 to about 10, and a number average molecular weight within the range of about 300 to about 15,000.

The invention also includes copolymers of the allyl esters described above and propoxylated allylic alcohols of the formula $CH_2=CR'-CH_2-(A)_n-OH$ in which A is an oxypropylene group, R' is selected from the group consisting of hydrogen and $C_1-C_5$ alkyl, and n, which is the average number of oxypropylene groups in the propoxylated allylic alcohol, has a value less than or equal to 2. These copolymers also have average hydroxyl functionalities within the range of about 2 to about 10, and number average molecular weights within the range of about 300 to about 15,000.

I found that, compared with other allylic alcohol copolymers, those of the invention are generally easier to prepare because of the similar monomeric reactivity ratios. Compared with poly(allyl alcohol), the copolymers of the invention have much better solubility in common organic solvents. The favorable solubility of the copolymers enables their easy formulation into a wide range of polymer products for which hydroxyl group-containing polymers are needed, including polyurethanes, polyesters, melamines, alkyds, uralkyds, and other thermoset polymers.

DETAILED DESCRIPTION OF THE INVENTION

Copolymers of the invention comprise recurring units of an allyl ester and an allylic alcohol or a propoxylated allylic alcohol.

Allyl esters suitable in the invention have the general structure: $CH_2=CR'-CH_2-O-CO-R$ in which R is hydrogen or a saturated linear, branched, or cyclic $C_1-C_{30}$ alkyl, aryl, or aralkyl group, and R' is selected from the group consisting of hydrogen and $C_1-C_5$ alkyl. Suitable allyl esters include, but are not limited to allyl formate, allyl acetate, allyl butyrate, allyl benzoate, methallyl acetate, and the like, and mixtures thereof. Particularly preferred are allyl esters derived from allyl alcohol and methallyl alcohol. Most preferred are $C_1-C_5$ alkyl esters of allyl alcohol and methallyl alcohol.

Allylic alcohols suitable in the invention have the general structure: $CH_2=CR'-CH_2-OH$ in which R' is selected from the group consisting of hydrogen and $C_1-C_5$ alkyl. Suitable allylic alcohols include, but are not limited to, allyl alcohol, methallyl alcohol, 2-ethyl-2-propen-1-ol, and the like, and mixtures thereof. Allyl alcohol and methallyl alcohol are preferred.

The relative proportions of allyl ester and allylic alcohol in the copolymer are not critical. The actual proportions used will generally depend upon many factors, including, for example, the desired hydroxyl end group content of the copolymer, the desired solubility characteristics, the identity of the R groups, and other considerations. Generally, the copolymers will comprise from about 1 to about 99 wt. % of the allyl ester and from about 99 to about 1 wt. % of the allylic alcohol. More preferred copolymers will have from about 5 to about 95 wt. % of the allyl ester and from about 95 to about 5 wt. % of the allylic alcohol. Most preferred are copolymers which comprise from about 30 to about 70 wt. % of the allyl ester and from about 70 to about 30 wt. % of the allylic alcohol.

The allyl ester/allylic alcohol copolymers of the invention have average hydroxyl functionalities within the range of about 2 to about 10, preferably from about 3 to about 6. The copolymers will have number average molecular weights within the range of about 300 to about 15,000. A more preferred range is from about 500 to about 3000.

Preferred allyl ester/allylic alcohol copolymers of the invention will have hydroxyl numbers within the range of about 10 to about 950 mg KOH/g. A more preferred range is from about 25 to about 500 mg KOH/g.

The invention includes copolymers which comprise recurring units of the allyl esters described above and propoxylated allylic alcohols of the formula $CH_2=CR'-CH_2-(A)_n-OH$ in which A is an oxypropylene group, R' is selected from the group consisting of hydrogen and $C_1-C_5$ alkyl, and n, which is the average number of oxypropylene groups in the propoxylated allylic alcohol, has a value less than or equal to 2. The oxypropylene groups in the propoxylated allylic alcohols have one or both of the structures —OCH(CH$_3$)—CH$_2$— and —O—CH$_2$—CH(CH$_3$)—, which will depend on the method of synthesis.

Suitable propoxylated allylic alcohols can be prepared by reacting an allylic alcohol with up to about 2 equivalents of propylene oxide in the presence of a basic catalyst as described, for example, in U.S. Pat. Nos. 3,268,561 and 4,618,703, the teachings of which are incorporated herein by reference. As will be apparent to those skilled in the art, suitable propoxylated allylic alcohols can also be made by acid catalysis, as described, for example, in *J. Am. Chem. Soc.* 71 (1949) 1152.

As with the allyl ester/allylic alcohol copolymers, the relative proportion of monomers used to make the allyl ester/propoxylated allylic alcohol copolymers of the invention is not critical. The copolymers preferably comprise from about 1 to about 99 wt. % of allyl ester recurring units, and from about 99 to about 1 wt % of propoxylated allylic alcohol recurring units. More preferred copolymers comprise from about 5 to about 95 wt. % of allyl ester recurring units, and from about 95 to about 5 wt. % of propoxylated allylic alcohol recurring units. Most preferred are copolymers comprising from about 30 to about 70 wt. % of allyl ester recurring units, and from about 70 to about 30 wt. % of propoxylated allylic alcohol recurring units.

The allyl ester/propoxylated allylic alcohol copolymers of the invention have average hydroxyl functionalities within the range of about 2 to about 10 (preferably from about 3 to about 6), and number average molecular weights within the range of about 300 to about 15,000 (more preferably from about 500 to about 3000).

Preferred allyl ester/propoxylated allylic alcohol copolymers of the invention will have hydroxyl numbers within the range of about 10 to about 480 mg KOH/g. A more preferred range is from about 25 to about 300 mg KOH/g.

The allyl ester copolymers of the invention are made by free-radical polymerization. The monomers can be simply combined and heated in the presence of a free-radical initiator at a temperature effective to polymerize the monomers. Suitable free-radical initiators are the peroxide and azo-type initiators well known to those skilled in the art. Peroxide initiators are preferred. Examples include hydrogen peroxide, benzoyl peroxide, di-tert-butylperoxide, tert-butylhydroperoxide, tert-butylperbenzoate, azobis(isobutyronitrile)(AIBN), and the like.

The monomers and free-radical initiator can be combined and reacted in any desired way. We found that improved yields can be achieved, however, if the initiator is added gradually to the reaction mixture during the course of the polymerization. Thus, it is preferred to introduce the initiator either continuously or intermittently to the polymerization reaction mixture.

The process can be performed at any temperature effective to initiate free-radical polymerization. Generally, it is preferred to perform the reaction at a temperature within the range of about 90° C. to about 200° C. A more preferred range is from about 125° C. to about 180° C.; most preferred is the range of about 135° C. to about 165° C.

The polymerizations can be performed at any suitable pressure. Generally, it is preferred to perform the polymerizations at pressures greater than 1 atmosphere, particularly when allyl alcohol is a reactant. Particularly preferred is the pressure range from about 20 to about 500 psi.

Optionally, a solvent is included in the polymerization. Suitable solvents are those in which the monomers, free-radical initiator, and polymeric reaction products are soluble. Preferred solvents for the polymerization include alcohols, ethers, esters, glycols, glycol ethers, and glycol ether esters. Aliphatic hydrocarbons are generally not suitable because the polymer products are usually not soluble in aliphatic hydrocarbons.

Compared with poly(allyl alcohol), the allyl ester copolymers of the invention are soluble in a broader range of organic solvents (see Table 1, below). Poly(allyl alcohol) is generally soluble in alcohols, but is not soluble in many commonly used organic solvents such as ethers, esters, ketones, and hydrocarbons. In contrast, the allyl ester copolymers of the invention are soluble in a broad range of solvents. The favorable solubility characteristics of these copolymers give formulators of adhesives, coatings, elastomers, and sealants greater flexibility.

Allyl ester copolymers are useful in a variety of applications, including, for example, polyesters, polyurethanes, alkyds, uralkyds, acrylates, melamine resins, and other thermoset polymers. These uses are described in more detail below, and in the examples.

The invention includes thermoset polyesters that are the reaction products of the allyl ester copolymers of the invention and an anhydride or a di- or polycarboxylic acid. The use of such a reaction to prepare a thermoset polyester coating from an allyl alcohol/allyl acetate copolymer is shown in Example 9 below. Suitable anhydrides and carboxylic acids are those commonly used in the polyester industry. Examples include, but are not limited to, phthalic anhydride, phthalic acid, maleic anhydride, maleic acid, adipic acid, isophthalic acid, terephthalic acid, sebacic acid, succinic acid, trimellitic anhydride, and the like, and mixtures thereof. Other suitable methods for making thermoset polyesters are described in U.S. Pat. No. 3,457,324, the teachings of which are incorporated herein by reference.

A polyurethane composition is made by reacting an allyl ester copolymer of the invention with a di- or polyisocyanate or an isocyanate-terminated prepolymer. Prepolymers derived from the allyl ester copolymers of the invention can be used. Optionally, a low molecular weight chain extender (diol, diamine, or the like) is included. Suitable di- or polyisocyanates are those well known in the polyurethane industry, and include, for example, toluene diisocyanate, MDI, polymeric MDIs, carbodiimide-modified MDIs, hydrogenated MDIs, isophorone diisocyanate, and the like. Isocyanate-terminated prepolymers are made in the usual way from a polyisocyanate and a polyether polyol, polyester polyol, or the like. The polyurethane is formulated at any desired NCO index. If desired, all of the available NCO groups are reacted with hydroxy groups from the allyl ester copolymers and any chain extenders. Alternatively, an excess of NCO groups remain in the product, as in a moisture-cured polyurethane. Many types of polyurethane products can be made, including, for example, adhesives, sealants, coatings, and elastomers. Example 10 illustrates a non-solvent polyurethane adhesive prepared from an isocyanate-terminated prepolymer and an allyl ester copolymer of the invention. Other suitable methods for making polyurethane compositions are described in U.S. Pat. No. 2,965,615, the teachings of which are incorporated herein by reference.

The invention includes alkyd compositions prepared by reacting an allyl ester copolymer of the invention with an unsaturated fatty acid. Suitable unsaturated fatty acids are those known in the art as useful for alkyd resins, and include, for example, oleic acid, ricinoleic acid, linoleic acid, licanic acid, and the like, and mixtures thereof. Mixtures of unsaturated fatty acids and saturated fatty acids such as lauric acid or palmitic acid can also be used. The alkyd resins are particularly useful for making alkyd coatings. For example, an allyl ester copolymer, or a mixture of an allyl ester copolymer and glycerin or another low molecular weight polyol, is first partially esterified with an unsaturated fatty acid to give an alkyd resin. The resin is then combined with an organic solvent, and the resin solution is stored until needed. A drying agent such as lead acetate or cobalt acetate is added to the solution of alkyd resin, the solution is spread onto a surface, the solvent evaporates, and the resin cures leaving an alkyd coating of the invention. Example 12 below shows one way to make an alkyd coating of the invention. Other suitable methods for making alkyd resins and coatings are described in U.S. Pat. No. 3,423,341, the teachings of which are incorporated herein by reference.

Instead of combining the alkyd resin with an organic solvent, the resin can be dispersed in water to make a water-based alkyd coating formulation. To improve the water dispersability of the alkyd resin, a free hydroxyl group in the alkyd resin can be converted to a salt. For example, the alkyd resin can be reacted with phthalic anhydride to give a resin that contains phthalic acid residues; addition of sodium hydroxide makes the sodium phthalate salt, and provides a water-dispersable alkyd resin derived from the allyl ester copolymer. See, for example, U.S. Pat. No. 3,483,152.

The invention includes polyurethane-modified alkyds (uralkyds) prepared from the allyl ester copolymers. These resins are especially valuable for making uralkyd coatings. The allyl ester copolymer is first partially esterified with an unsaturated fatty acid (described above) to give an alkyd resin. The alkyd resin, which contains some free hydroxyl groups, is reacted with a di- or polyisocyanate (described above) to give a prepolymer. The prepolymer is then reacted with a chain extender, atmospheric moisture, or additional alkyd resin to give a uralkyd coating. Other suitable methods for making uralkyd resins and coatings are described in U.S. Pat. No. 3,267,058, the teachings of which are incorporated herein by reference.

The invention includes thermoset polymers prepared by reacting the allyl ester copolymers of the invention with a thermoplastic polymer or a crosslinking agent. For example, melamine-based polymers, especially coatings, can be prepared by reacting the allyl ester copolymers with melamine resins. Suitable melamine resins include commercial grade hexamethoxymethylmelamines, such as, for example, CYMEL 303 crosslinking agent, a product of American Cyanamid Company. Example 8 below illustrates the preparation of a melamine coating from an allyl alcohol/allyl acetate copolymer. A thermoset resin is obtained by reacting the allyl ester copolymers of the invention with a crosslinkable thermoplastic resin. Suitable crosslinkable thermoplastic resins are anhydride or carboxylic acid-containing polymers such as, for example, polyacrylic acid, polymethacrylic acid, isobutylene-maleic anhydride copolymers, and styrene-maleic anhydride copolymers. Example 11 below illustrates the preparation of a crosslinked polymeric film of this type from an an allyl alcohol/allyl acetate copolymer and a styrene-maleic anhydride copolymer.

An acrylate composition of the invention is prepared by reacting some or all of the hydroxyl groups of the allyl ester copolymers with an acrylic acid or acrylic acid derivative. Suitable acrylic acids and derivatives include acrylic acid, methacrylic acid, acryloyl chloride, methacryloyl chloride, methyl acrylate, methyl methacrylate, and the like. Example 13 below illustrates this application. Suitable methods for preparing acrylates are described, for example, in U.S. Pat. No. 2,917,538, the teachings of which are incorporated herein by reference.

The favorable solubility characteristics of the allyl ester copolymers of the invention make them well-suited for blending with other polymers. The copolymers of the invention are easily blended with, for example, polyether polyols, phenolic resins, acrylates, and epoxy resins, and the blends can be used in the applications described earlier. The allyl ester copolymers can also be used as compatibilizers to improve the miscibility of polymer mixtures. In contrast, poly(allyl alcohol) is generally not compatible with other polymers, and cannot be blended with polymers or used as a compatibilizer for other polymers.

The following examples merely illustrate the invention. Those skilled in the art will recognize many variations that are within the spirit of the invention and scope of the claims.

EXAMPLE 1

Preparation of Allyl Alcohol/Allyl Acetate Copolymer

Allyl alcohol (200 g), allyl acetate (200 g), and di-tert-butylperoxide (10 g) are charged to a one-liter stainless-steel reactor equipped with an addition pump, stirrer, steam heating jacket, temperature controller, nitrogen inlet, and vacuum distillation apparatus. The reactor is purged three times with nitrogen, is sealed, and the contents are heated to 150° C. Di-tert-butylperoxide (40 g) is added continuously to the reactor using the addition pump over 2.5 h. Polymerization continues at 150° C for an additional 2 h. Unreacted monomers are removed by vacuum distillation. The last traces of residual monomer are removed by stripping with water.

The yield of clear, slightly yellow liquid copolymer is 166 g (41.5%). Hydroxyl number=350 mg KOH/g. Gel permeation chromatography (GPC) using polystyrene standards shows that the product has Mw=1081, Mn=708, and Mw/Mn=1.52.

EXAMPLE 2

Preparation of Allyl Alcohol/Allyl Acetate Copolymer

The procedure of Example 1 is generally followed with allyl alcohol (120 g), allyl acetate (600 g), and tert-butylhydroperoxide (70% in water, 23 g) as the initiator. After purging the reactor with nitrogen and sealing it, the contents are heated to 150° C. Additional 70% aq. tert-butylhydroperoxide (80 g) is added continuously to the reactor using the addition pump over 4 h. Polymerization continues at 150° C for an additional 0.5 h. Unreacted monomers are removed by vacuum distillation. The last traces of residual monomer are removed by stripping with water.

The yield of clear, slightly yellow liquid copolymer is 310 g (43.1%). Hydroxyl number=107 mg KOH/g. GPC analysis: Mw=1248, Mn=778, and Mw/Mn=1.60.

EXAMPLE 3

Preparation of Allyl Alcohol/Allyl Butyrate Copolymer

The procedure of Example 1 is generally followed with allyl alcohol (120 g), allyl butyrate (600 g), and tert-butylhydroperoxide (70% in water, 23 g). After purging the reactor with nitrogen and sealing it, the contents are heated to 150° C. Additional 70% aq. tert-butylhydroperoxide (80 g) is added continuously to the reactor using the addition pump over 4 h. Polymerization continues at 150° C. for an additional 0.5 h. Unreacted monomers are removed by vacuum distillation. The last traces of residual monomer are removed by stripping with water.

The yield of clear, slightly yellow liquid copolymer is 402 g (55.9%). Hydroxyl number=93 mg KOH/g. GPC analysis: Mw=1811, Mn=1103, and Mw/Mn=1.64.

EXAMPLE 4

Preparation of Allyl Alcohol/Allyl Butyrate Copolymer

The procedure of Example 1 is generally followed with allyl alcohol (60 g), allyl butyrate (600 g), and di-tert-butylperoxide (6.0 g). The reactor is purged three times with nitrogen, is sealed, and the contents are heated to 150° C. Di-tert-butylperoxide (60 g) is added continuously to the reactor using the addition pump over 5 h. Polymerization continues at 150° C. for an additional 0.5 h. Unreacted monomers are removed by vacuum distillation. The last traces of residual monomer are removed by stripping with water.

The yield of clear, slightly yellow liquid copolymer is 476 g (72.2%). Hydroxyl number=48 mg KOH/g. GPC analysis: Mw=2220, Mn=1270, and Mw/Mn=1.75.

EXAMPLE 5

Preparation of Propoxylated Allyl Alcohol/Allyl Acetate Copolymer

The procedure of Example 1 is generally followed with propoxylated allyl alcohol (average of 1.6 oxypropylene units; 300 g), allyl acetate (300 g), and di-tertbutylperoxide (20 g). The reactor is purged three times with nitrogen, is sealed, and the contents are heated to 150° C. Di-tert-butylperoxide (80 g) is added continuously to the reactor using the addition pump over 4 h. Polymerization continues at 150° C. for an additional 0.5 h. Unreacted monomers are removed by vacuum distillation. The last traces of residual monomer are removed by stripping with water.

The yield of clear, slightly yellow liquid copolymer is 420 g (70.0%). Hydroxyl number=127 mg KOH/g. GPC analysis: Mw=1810, Mn=1040, and Mw/Mn=1.73.

Comparative Example 6

Preparation of Poly(allyl alcohol)

The procedure of Example 1 is generally followed to make poly(allyl alcohol). Allyl alcohol (432 g) and tert-butylperoxide (6 g) are initially charged to the reactor. The remaining tert-butylperoxide (60 g) is added to the reactor at 150° C. over 5 h. Polymerization continues at 150° C. for an additional 0.5 h. Unreacted monomers are removed by vacuum distillation. The last traces of residual monomer are removed by stripping with water.

The yield of viscous clear, slightly yellow liquid copolymer is 121 g (28.0%). Carbon-13 NMR analysis shows that the product is a homopolymer of allyl alcohol. Hydroxyl number and GPC analysis are not obtained because the product is not soluble in the solvents used for analysis.

EXAMPLE 7

Solubility Testing of Allylic Alcohol/Allyl Ester Copolymers

The solubility of the polymers obtained in Examples 1–5 and Comparative Example 6 is tested in a variety of common organic solvents, including isopropyl alcohol, propylene glycol tert-butyl ether, tetrahydrofuran, acetone, methyl ethyl ketone, methyl isobutyl ketone, ethyl acetate, xylenes, and cyclohexane. Results appear in Table 1. Solubility is tested by mixing 10 wt. % of the polymer in the solvent to give a clear solution (soluble=sol), a cloudy solution (partly soluble=p. sol), or two distinct layers (insoluble=insol).

The results suggest that the copolymers of the invention, because they have good solubility in a broad range of common organic solvents, will be easy to formulate into many end uses, especially when compared with poly(allyl alcohol).

EXAMPLE 8

Melamine Coatings from an Allyl Alcohol/Allyl Acetate Copolymer

The allyl alcohol/allyl acetate copolymer of Example 2 is formulated into melamine coatings as follows. The copolymer (45 g) is mixed with CYMEL 303 melamine resin (15 g, product of American Cyanamid), p-toluenesulfonic acid (0.06 g), methyl ethyl ketone (9 g), and ethyl acetate (9 g). The solution is coated onto aluminum Q-panels (AI-35, Paul N. Gardner Co., Inc.) at a wet thickness of about 3 mils. The coated panels are dried in a hood for 12 h at room temperature, and are then cured in an oven at 110° C. to 120° C. for 15 to 90 min. The coatings show good hardness, adhesion, and flexibility properties.

EXAMPLE 9

Preparation of a Thermoset Polyester Coating

In this example, an allyl alcohol/allyl acetate copolymer is formulated into a thermosetting polyester coating. An allyl alcohol/allyl acetate copolymer (500 g, prepared as in Example 1) and isophthalic acid (94 g) are charged into a reactor and heated to 220° C. while sparging nitrogen through the mixture. After the acid number reaches 60–70 mg KOH/g, adipic acid (73 g), isophthalic acid (60 g), and maleic anhydride (6 g) are added, and the mixture is reheated to 220° C. Heating continues at 220° C. until the acid number drops to 10–12 mg KOH/g. 2-Ethoxyethanol acetate (270 g) is then added.

Six hundred grams of the resulting polyester solution is charged into a reactor equipped with an agitator, thermometer, reflux condenser, addition funnel, and nitrogen inlet, and the mixture is heated to 120° C. A mixture of 2-hydroxyethyl acrylate (10 g), ethyl acrylate (54 g), styrene (5 g), methyl methacrylate (20 g), methacrylic acid (2 g), and di-t-butylperoxide (1.0 g) is charged to the addition funnel. The acrylate monomer mixture is added to the polyester mixture over 2 h, and is then kept at 120° C. for another hour. t-Butyl perbenzoate (0.2 g) is added, and the mixture is kept at 120° C. for another 2 h. A second 0.2 g portion of t-butyl perbenzoate is added, and heating continues for another 2 h. The product solution is finally diluted with 1-butanol (30 g) and xylene (20 g). This solution is expected to be useful as a thermosettable coating. The solution can be applied as a film, and allowed to cure at room temperature or elevated temperature.

EXAMPLE 10

Preparation of a Non-Solvent Polyurethane Adhesive

This example illustrates the preparation of a non-solvent polyurethane adhesive by reacting an allyl alcohol/allyl acetate copolymer with an isocyanate-terminated prepolymer.

An allyl alcohol/allyl acetate copolymer (10 g, prepared as in Example 1), is mixed well at room temperature with 10 g of a prepolymer (5.7 wt. % NCO) prepared from ARCOL 3020 polyether triol (2000 mol. wt., all-PO triol, product of ARCO Chemical Co.), and toluene diisocyanate. The resulting adhesive mixture is expected to be useful for bonding wood, stainless steel, glass, and polystyrene plastic.

EXAMPLE 11

Preparation of a Crosslinked Polymer Film

In this example, an allyl alcohol/allyl acetate copolymer is used to make a crosslinked polymer film.

DYLARK 378 resin (a terpolymer of styrene (67%), maleic anhydride (13%), and butadiene rubber (20%), product of ARCO Chemical Co., 10 g), and the allyl alcohol/allyl acetate copolymer of Example 1 (1.5 g) are dissolved in tetrahydrofuran (50 g). The solution is spread and dried on an aluminum pan. The resulting polymer film is cured at 200° C. for 0.5 h. The expected product is a cured, thermoset polymer

EXAMPLE 12

Preparation of an Alkyd Coating

In this example, an alkyd coating is prepared from an allyl alcohol/allyl acetate copolymer.

The allyl alcohol/allyl acetate copolymer of Example 1 (87 g), safflower oil (64 g), lithium hydroxide (0.03 g), phthalic anhydride (25.5 g), maleic anhydride (0.22 g), triphenyl phosphite (0.07 g), and xylene (18 g) are charged into a reactor equipped with an agitator, thermometer, reflux condenser with a Dean-Stark trap, and nitrogen inlet. The mixture is heated to 240° C., and is kept at that temperature until the acid number drops to 10–20 mg KOH/g. After the reaction, xylene is added to dilute the mixture to 50 wt. % solids. This solution is expected to be useful as an alkyd coating. The solution can be applied as a film, and allowed to cure at room temperature or at elevated temperature.

EXAMPLE 13

Preparation of a Curable Acrylate Composition

In this example, a curable acrylate composition is prepared from an allyl alcohol/allyl acetate copolymer.

The allyl alcohol/allyl acetate copolymer of Example 2 (100 g), acrylic acid (13.8 g), toluene (20 g), hydroquinone (0.15 g), and sulfuric acid (0.15 g), are charged into a reactor equipped with an agitator, thermometer, reflux condenser with Dean-Stark trap, and nitrogen inlet. The mixture is heated to reflux (about 100° C. to 115° C.), and water (3.4 g) is removed using the trap. After no additional water is being produced, the toluene is removed by vacuum distillation. The expected product is a copolymer of allyl alcohol and allyl acetate in which most or all of the hydroxyl groups from the original copolymer are converted to acrylate ester groups.

TABLE 1

| Solubility of Allylic Alcohol/Allyl Ester Copolymers in Common Organic Solvents | | | | | | |
|---|---|---|---|---|---|---|
| | Ex. 1 AA/AAc | Ex. 2 AA/AAc | Ex. 3 AA/ABu | Ex. 4 AA/ABu | Ex. 5 AAP/AAc | Comp. Ex. 6 poly(AA) |
| isopropyl alcohol | sol | sol | sol | sol | sol | sol |
| propylene glycol t-butyl ether | sol | sol | sol | sol | sol | insol |
| tetrahydrofuran | sol | sol | sol | sol | sol | insol |
| acetone | sol | sol | sol | sol | sol | insol |
| methyl ethyl ketone | sol | sol | sol | sol | sol | insol |
| methyl isobutyl ketone | sol | sol | sol | sol | sol | insol |
| ethyl acetate | sol | sol | sol | sol | sol | insol |
| xylenes | sol | sol | sol | sol | sol | insol |
| cyclohexane | insol | insol | p. sol | sol | insol | insol |

Solubility is tested by mixing 10 wt. % polymer in the solvent to give a clear solution (sol), a cloudy solution (p. sol), or two distinct layers (insol).
AA/AAc = allyl alcohol/allyl acetate copolymer; AA/ABu = allyl alcohol/allyl butyrate copolymer; AAP/AAc = propoxylated allyl alcohol/allyl acetate copolymer; poly(AA) = poly(allyl alcohol).

I claim:
1. A copolymer which comprises recurring units of:
(a) an allyl ester of the formula $CH_2=CR'-CH_2-O-CO-R$ in which R is hydrogen or a saturated linear, branched, or cyclic $C_1-C_{30}$ alkyl, aryl, or aralkyl group, and R' is selected from the group consisting of hydrogen and $C_1-C_5$ alkyl; and
(b) a propoxylated allylic alcohol of the formula:

$CH_2=CR'-CH_2-(A)_n-OH$ in which A is an oxypropylene group, R' is selected from the group consisting of hydrogen and $C_1-C_5$ alkyl, and n, which is the average number of oxypropylene groups in the propoxylated allylic alcohol, has a value less than or equal to 2;

wherein the copolymer has an average hydroxyl functionality within the range of about 2 to about 10, and a number average molecular weight within the range of about 300 to about 15,000.

2. The copolymer of claim 1 having from about 5 to about 95 wt. % of allyl ester recurring units and from about 95 to about 5 wt. % of propoxylated allylic alcohol recurring units.

3. The copolymer of claim 1 wherein the allyl ester has the formula $CH_2=CH-CH_2-O-CO-R$ in which R is a $C_1-C_5$ alkyl group.

4. The copolymer of claim 1 wherein the propoxylated allylic alcohol has the formula $CH_2=CH-CH_2-(A)_n-OH$ in which A is an oxypropylene group, and n, which is the average number of oxypropylene groups in the propoxylated allylic alcohol, has a value less than or equal to 2.

5. The copolymer of claim 1 having a number average molecular weight within the range of about 500 and about 3000, and a hydroxyl number within the range of about 10 mg KOH/g to about 480 mg KOH/g.

* * * * *